United States Patent
Oh et al.

(10) Patent No.: US 11,365,673 B2
(45) Date of Patent: Jun. 21, 2022

(54) INTEGRATED COOLANT HEATING MODULE FOR VEHICLE

(71) Applicants: HYUNDAI MOTOR COMPANY, Seoul (KR); KIA MOTORS CORPORATION, Seoul (KR); HYUNDAI WIA CORPORATION, Changwon-si (KR)

(72) Inventors: Man Ju Oh, Yongin-si (KR); Sang Shin Lee, Suwon-si (KR); Keon Sik Lee, Suwon-si (KR); Man Hee Kim, Seoul (KR); Seon Gyu Im, Pyeongtaek-si (KR); Chang Won Lee, Suwon-si (KR)

(73) Assignees: HYUNDAI MOTOR COMPANY, Seoul (KR); KIA MOTORS CORPORATION, Seoul (KR); HYUNDAI WIA CORPORATION, Changwon-si (KR)

( * ) Notice: Subject to any disclaimer, the term of this patent is extended or adjusted under 35 U.S.C. 154(b) by 67 days.

(21) Appl. No.: 17/110,533

(22) Filed: Dec. 3, 2020

(65) Prior Publication Data
US 2021/0180506 A1    Jun. 17, 2021

(30) Foreign Application Priority Data
Dec. 12, 2019  (KR) .......................... 10-2019-0166030

(51) Int. Cl.
*B60H 1/00* (2006.01)
*F01P 11/20* (2006.01)
(Continued)

(52) U.S. Cl.
CPC ................ *F01P 11/20* (2013.01); *B60H 1/22* (2013.01); *B60H 1/3227* (2013.01); *F01P 3/20* (2013.01);
(Continued)

(58) Field of Classification Search
CPC ............ B60H 1/00392; B60H 1/00007; B60H 1/00885; B60H 1/22; B60H 1/2215;
(Continued)

(56) References Cited

FOREIGN PATENT DOCUMENTS

CN       102032638 A  *  4/2011  ......... B60H 1/00371
EP       3396290 A1      10/2018
(Continued)

*Primary Examiner* — George C Jin
*Assistant Examiner* — Teuta B Holbrook
(74) *Attorney, Agent, or Firm* — McDonnell Boehnen Hulbert & Berghoff LLP

(57) ABSTRACT

An integrated coolant heating module for a vehicle includes a water-cooled condenser having a plurality of refrigerant inlet/outlet ports and a plurality of coolant inlet/outlet ports, and exchanging heat between coolant and refrigerant that circulate therein, a water heater having a plurality of mounting parts, the water heater being coupled to the water-cooled condenser and selectively heating the coolant passing through the water-cooled condenser, a multi-way valve coupled to a mounting part of the water heater, and controlling a direction of flow of the coolant, and a water pump coupled to a mounting part of the water heater, having a first side connected to the multi-way valve and a second side connected to a second coolant inlet/outlet port of the water-cooled condenser, and creating a pressure of the coolant between the multi-way valve and the water-cooled condenser.

15 Claims, 2 Drawing Sheets

(51) Int. Cl.
   *F01P 5/10*   (2006.01)
   *F01P 3/20*   (2006.01)
   *B60H 1/22*   (2006.01)
   *B60H 1/32*   (2006.01)
(52) U.S. Cl.
   CPC ...... *F01P 5/10* (2013.01); *B60H 2001/00307* (2013.01)
(58) Field of Classification Search
   CPC .................. B60H 1/3227; B60H 1/32; B60H 2001/2278; F01P 3/20; F01P 5/10; F01P 2060/14; F01P 2060/18; F01P 3/18; F01P 2003/182
   See application file for complete search history.

(56) References Cited

FOREIGN PATENT DOCUMENTS

| | | | |
|---|---|---|---|
| KR | 2019-0122566 | A | 10/2019 |
| KR | 2021-0016731 | A | 2/2021 |
| KR | 2021-0038120 | A | 4/2021 |
| KR | 2021-0041388 | A | 4/2021 |
| KR | 2021-0058462 | A | 5/2021 |

* cited by examiner

INTEGRATED COOLANT HEATING MODULE FOR VEHICLE

CROSS REFERENCE TO RELATED APPLICATIONS

The present application claims priority to Korean Patent Application No. 10-2019-0166030, filed Dec. 12, 2019, the entire contents of which is incorporated herein for all purposes by this reference.

BACKGROUND

Field

The present disclosure relates generally to a coolant heating module for a vehicle. More particularly, the present disclosure relates to a coolant heating module for a vehicle, where the module has a structure in which a multi-way valve and a water pump are coupled to mounting parts of a water heater, which reduces the number of components for connection, resulting in cost savings and improved electric vehicle (EV) efficiency, and the water heater and a water-cooled condenser are assemblable to each other, which promotes modularization resulting in easy manufacturing of the module.

Description of the Related Art

In general, a vehicle is provided with a water heater and a water-cooled condenser for indoor air conditioning, and engine or battery temperature control.

For modularization of the water heater and the water-cooled condenser, a main bracket configured as a guide form is provided. The main bracket surrounds upper and lower portions of the water heater and the water-cooled condenser, and the water heater and the water-cooled condenser are coupled to the main bracket to be mechanically connected to each other. Further, a plurality of sub-brackets is provided on the main bracket. A water pump and a multi-way valve are coupled to the sub-brackets, and a plurality of connecting members e.g. bolts are required for the coupling.

In a coolant heating module for coolant heating, various studies have been conducted to reduce the space required for modularization. One example of such a coolant heating module is disclosed in Korean Patent Application Publication No. 10-2019-0122566, entitled "Heater module for heating coolant" which has a structure in which a water heater, a pump, and a valve are integrally modularized. However, in the above related art, provision of a number of members is required for connection, e.g., a base bracket, a fluid pump fixing bracket, a channel switching valve fixing bracket, and a fastening bolt. The coolant heating module configured by a plurality of connecting members as described above is problematic in that the number of components required may increase. This may lead to an increase in cost, and a decrease in electric vehicle (EV) efficiency due to an increase in weight.

There is thus a need to develop an integrated coolant heating module.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide an integrated coolant heating module for a vehicle, wherein mounting parts are formed at a water heater so that a water pump and a multi-way valve are coupled to the water heater by the mounting parts without requiring separate connecting members, and a water-cooled condenser is disposed on a side of the water heater, where a coupling part is formed at the water heater so that the water heater and the water-cooled condenser are directly connected to each other, and the coupling part is configured to be detachable so that the water heater and the water-cooled condenser are detachably assembled to each other.

In order to achieve the above objective, according to one aspect of the present disclosure, there is provided an integrated coolant heating module for a vehicle, the module including a water-cooled condenser having a plurality of refrigerant inlet/outlet ports and a plurality of coolant inlet/outlet ports, and configured to exchange heat between coolant and refrigerant that circulate therein, a water heater having a plurality of mounting parts formed on an outer surface thereof, the water heater being coupled to the water-cooled condenser at one side thereof, and being configured to selectively heat the coolant passing through the water-cooled condenser by being connected to a first coolant inlet/outlet port of the water-cooled condenser at an inlet thereof, a multi-way valve coupled to a mounting part of the water heater, and configured to control a direction of flow of the coolant, and a water pump coupled to a mounting part of the water heater, having a first side connected to the multi-way valve and a second side connected to a second coolant inlet/outlet port of the water-cooled condenser, and configured to create a pressure of the coolant between the multi-way valve and the water-cooled condenser.

Further, the water heater may include a main body having a built-in heater module, and a cover covering the main body, wherein the cover may be an integrally injection-molded structure including the mounting parts.

Further, respective lower ends of the water heater and the water-cooled condenser may be coupled to a vehicle body, the water-cooled condenser may be disposed on a side of the water heater, the main body of the water heater may have a coupling part formed on a side surface thereof and coupled to the water-cooled condenser, and the water heater and the water-cooled condenser may be directly coupled to each other by the coupling part.

The coupling part of the water heater may be configured to be detachable from the water-cooled condenser so that the water heater and the water-cooled condenser may be detachably assembled to each other.

The main body of the water heater may have an open upper surface, and the cover may be coupled to the upper surface of the main body, and first to third mounting parts may be formed on an upper surface of the cover and arranged in a triangle shape, wherein the first mounting part may be formed on a first end of the upper surface of the cover, the second mounting part may be formed on a second end of the upper surface of the cover, and the third mounting part may be formed on a front end of the upper surface of the cover on a central axis between the first and second mounting parts.

Further, the water pump may be coupled to the first and second mounting parts, and the multi-way valve may be coupled to the third mounting part.

The module may further include a bracket provided to surround an outer circumferential surface of the water pump, and directly coupled to the mounting part of the water heater to couple the water pump to the water heater.

Further, a damper may be provided on an inner circumferential surface of the bracket where the bracket and the water pump are in contact with each other, and the damper may be configured to insulate noise or vibration of the water pump from being transmitted to a vehicle body through the water heater due to contact between the bracket and the water pump.

The bracket may include a lower bracket provided along a circumference of a lower surface of the water pump and directly connected to the mounting part of the water heater, and an upper bracket provided along a circumference of an upper surface of the water pump and having opposite ends connected to the lower bracket.

Further, a through-hole allowing a fastening bolt to be inserted thereinto may be formed at each of opposite sides of each of the lower bracket and the upper bracket, and the fastening bolt may pass through the respective through-holes of the lower bracket and the upper bracket to couple the lower bracket and the upper bracket to each other.

Further, a hole allowing a flange bolt to be inserted thereinto may be formed in an upper surface of the mounting part of the water heater, a damper bush additionally absorbing noise or vibration of the water pump may be coupled to each of opposite ends of the lower bracket, and the damper bush and the mounting part may be coupled to each other by the flange bolt whereby the lower bracket may be connected to the water heater.

The multi-way valve may include a fixing part directly connected to the mounting part of the water heater.

Further, the multi-way valve may be an integrally injection-molded structure including the fixing part.

The module may further include a printed circuit board (PCB) for integrated control that simultaneously controls driving of the water heater, the multi-way valve, and the water pump.

The water pump and multi-way valve may be directly connected to each other, the inlet of the water heater may be connected to the first coolant inlet/outlet port of the water-cooled condenser by a hose, and the multi-way valve may be connected to the second coolant inlet/outlet port of the water-cooled condenser by a hose.

According to the integrated coolant heating module for the vehicle according to the present disclosure, the water pump and the multi-way valve are coupled to the mounting parts of the water heater, which reduces the number of components required for connection resulting in weight reduction. Therefore, there are advantages of cost savings and improved electric vehicle (EV) efficiency.

Further, the module has a structure that promotes modularization, thus having an advantage in that the module can be installed in a vehicle while occupying a small space and thus can be easy to design, and in that by the PCB for integrated control, efficient control can be achieved.

BRIEF DESCRIPTION OF THE FIGURES

The above and other objectives, features, and other advantages of the present disclosure will be more clearly understood from the following detailed description when taken in conjunction with the accompanying drawings, in which.

DETAILED DESCRIPTION

Figure 1:
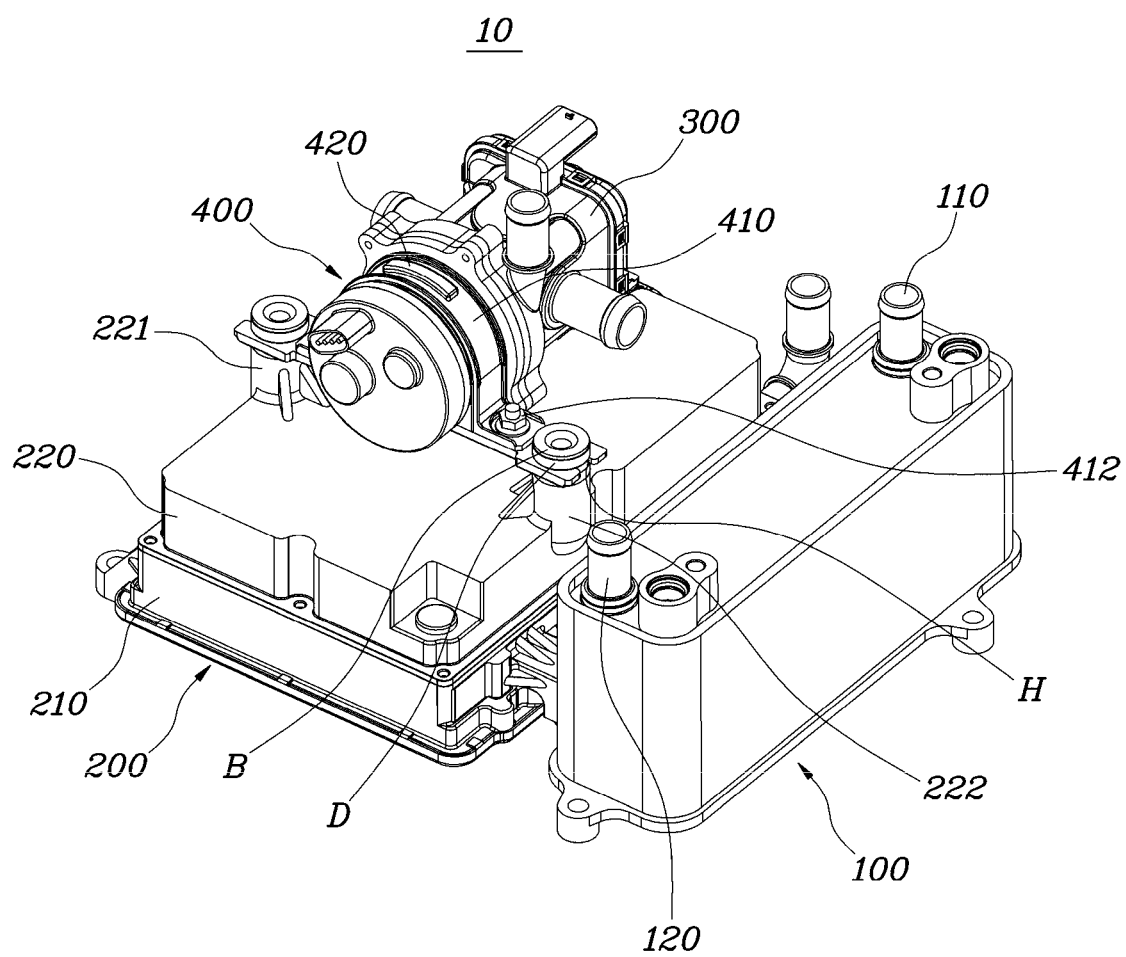
FIG. 1 is a perspective view illustrating an integrated coolant heating module for a vehicle according to an embodiment of the present disclosure.

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. Therefore, the embodiments of the present disclosure are disclosed only for illustrative purposes and should not be construed as limiting the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Hereinbelow, an exemplary embodiment of the present disclosure will be described in detail with reference to the accompanying drawings. Throughout the drawings, the same reference numerals will refer to the same or like parts.

The present disclosure relates to an integrated coolant heating module 10 for a vehicle, the module including a water-cooled condenser 100, a water heater 200, a multi-way valve 300, and a water pump 400 that are coupled to each other.

Figure 2:
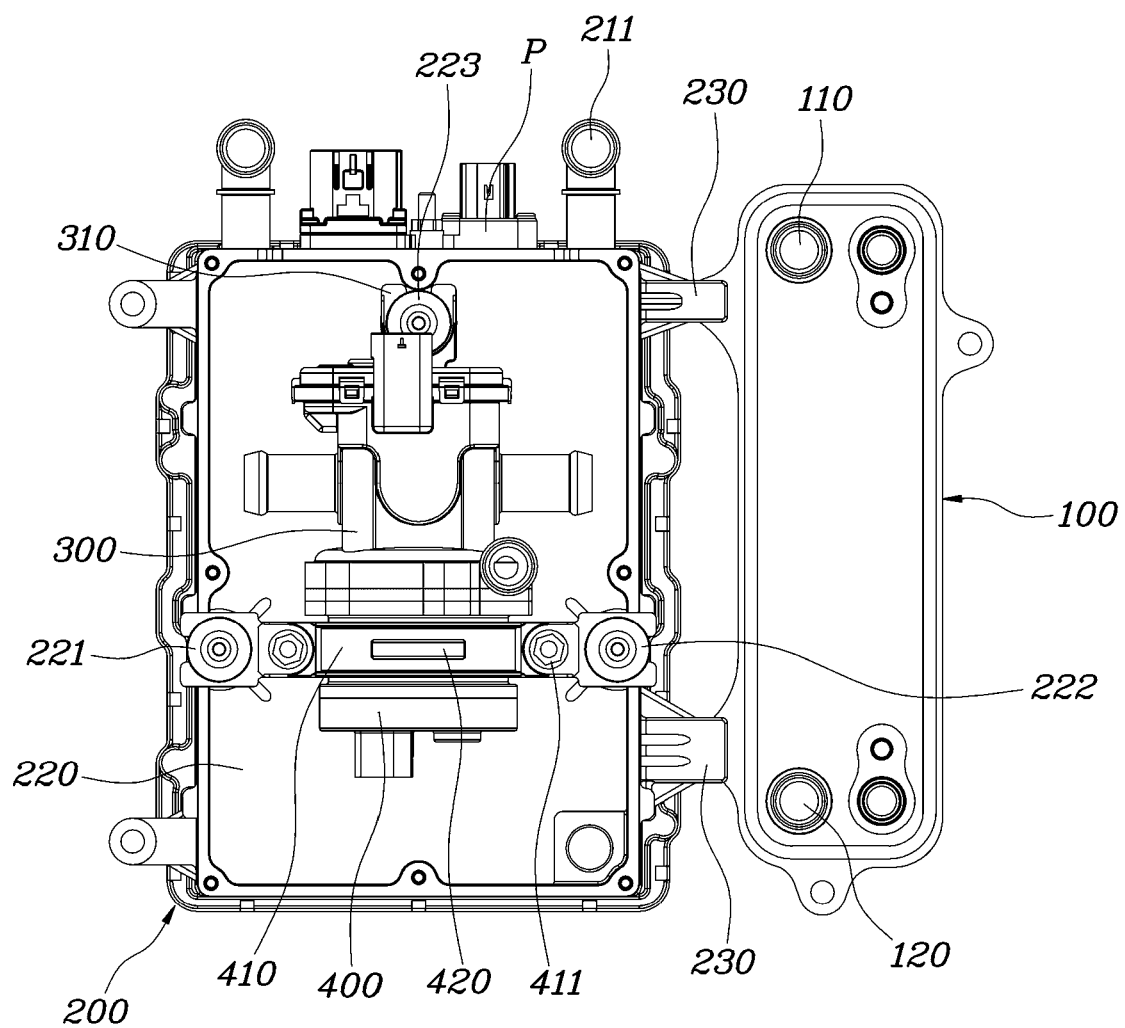
FIG. 2 is a plan view illustrating the integrated coolant heating module for the vehicle according to the embodiment of the present disclosure.

FIG. 1 is a perspective view illustrating the integrated coolant heating module 10 for the vehicle according to an embodiment of the present disclosure, and FIG. 2 is a plan view illustrating the integrated coolant heating module 10 for the vehicle according to the embodiment of the present disclosure.

Referring to FIGS. 1 and 2, the integrated coolant heating module 10 for the vehicle according to the embodiment of the present disclosure may include the water-cooled condenser 100, the water heater 200, the multi-way valve 300, and the water pump 400.

The water-cooled condenser 100 may perform a function of exchanging heat between coolant and refrigerant that circulate therein. The water-cooled condenser 100 may have a plurality of refrigerant inlet/outlet ports and a plurality of coolant inlet/outlet ports. The coolant inlet/outlet ports may include a first coolant inlet/outlet port 110 and a second coolant inlet/outlet port 120. The first coolant inlet/outlet port 110 may be connected to the water heater 200, and the second coolant inlet/outlet port 120 may be connected to the water pump 400.

When the integrated coolant heating module 10 for the vehicle is installed in an actual vehicle, the water pump 400 and the multi-way valve 300 may be directly connected to each other, an inlet of the water heater 200 may be connected to the first coolant inlet/outlet port 110 of the water-cooled condenser 100 by a hose, and the multi-way valve 300 may be connected to the second coolant inlet/outlet port 120 of the water-cooled condenser 100 by a hose. Accordingly, a continuous flow path is established for coolant to flow therethrough. In order to drive an air conditioning system that controls temperature and humidity in a vehicle interior or a cooling system that cools an engine, a battery, a motor, and the like, connection between components constituting the module is necessary, which allows flow of coolant. In the present disclosure, the integrated coolant heating module has a modularized structure, thus having advantages of a structurally simple structure, a small occupying space, and a simplified assembly process.

The water heater 200 may selectively heat coolant passing through the water-cooled condenser 100 by being connected to the first coolant inlet/outlet port 110 of the water-cooled condenser 10 at the inlet thereof. The second coolant inlet/outlet port 110 of the water-cooled condenser 100 may be connected to the multi-way valve 300.

The water heater 200 may selectively heat coolant passing through the water-cooled condenser 100 by being connected to the water-cooled condenser 100. A plurality of mounting parts may be formed on an outer surface of the water heater 200. The plurality of mounting parts may be coupled to the multi-way valve 300 and the water pump 400.

The multi-way valve 300 is a multi-ported valve and may perform a function of controlling flow of coolant. The multi-way valve 300 may be coupled to a mounting part of the water heater 200. In the related art, a separate connecting member e.g. a sub-bracket, is provided at a rear side of the multi-way valve 300, and the connecting member is configured to be connected to a main bracket of the water heater 200. However, in the present disclosure, the multi-way valve 300 is configured to be directly coupled to the mounting part of the water heater 200, and thus has an advantage of not requiring provision of the separate connecting member e.g. the sub-bracket.

The water pump 400 may perform a function of creating a water pressure by controlling the flow rate of coolant between the multi-way valve 300 and the water-cooled condenser 100. The water pump 400 may be coupled to a mounting part of the water heater 200. The water pump 400 may have a first side connected to the multi-way valve 300, and a second side connected to the second coolant inlet/outlet port 120 of the water-cooled condenser 100.

Referring to FIGS. 1 and 2, the water heater 200 may include a main body 210 and a cover 220. The main body 210 may have a built-in heater module. The coolant may be introduced into the main body 210 and the introduced coolant may be heated by the heater module. The main body 210 may be configured to have an open upper surface. The cover 220 may be coupled to an upper surface of the main body 210 to cover the main body 210.

The cover 220 may be an integrally injection-molded structure including the plurality of mounting parts. That is, the cover 220 may be configured to be able to be injection-molded integrally with the mounting parts, thus not requiring provision of separate members for coupling the multi-way valve 300 and the water pump 400 to the cover 220.

When the integrated coolant heating module 10 for the vehicle according to the embodiment of the present disclosure is installed in an actual vehicle, respective lower ends of the water heater 200 and the water-cooled condenser 100 may be coupled to a vehicle body. That is, a lower end of the main body 210 of the water heater 200 is coupled to the vehicle body, and the cover 220 is located on the upper surface of the main body 210. The water-cooled condenser 100 may be disposed on a side of the water heater 200. The main body 210 of the water heater 200 may have a coupling part 230 formed on a side surface thereof and coupled to the water-cooled condenser 100. The water-cooled condenser 100 may be directly coupled to the water heater 200 by the coupling part 230. The coupling part 230 may be configured to be selectively detachable from the water-cooled condenser 100 so that the water heater 200 and the water-cooled condenser 100 may be integrally detachably assembled to each other.

In the related art, a separate connecting member, e.g., the main bracket provided on upper and lower portions of the water heater 200 and the water-cooled condenser 100 to surround the water heater 200 and the water-cooled condenser 100, is necessary for modularization. In the present disclosure, the water heater 200 and the water-cooled condenser 100 are connected to the main bracket, and the water pump 400 and the multi-way valve 300 are located above the water heater 200 and the water-cooled condenser 100. This structure increases the number of components constituting the module and thereby increases the weight of the entire system. Therefore, there is a problem in that costs are increased and electric vehicle (EV) efficiency is reduced.

However, in the integrated coolant heating module 10 for the vehicle according to the embodiment of the present disclosure, as illustrated in FIGS. 1 and 2, since the water-cooled condenser 100 and the water heater 200 are assemblable to each other in such a manner that the water-cooled condenser 100 is coupled to the water heater 200 by the coupling part 230 of the water heater 200. This structure provides an advantage in that modularization can be achieved without requiring provision of the connecting member e.g. the main bracket. This modularization thus can reduce the number of components required, resulting in a structurally simple structure, which can reduce manufacturing costs.

The plurality of mounting parts may be formed on the upper surface of the cover 220 so as to be exposed externally. As illustrated in FIGS. 1 and 2, the mounting parts may include a first mounting part 221, a second mounting part 222, and a third mounting part 223. These mounting parts may be arranged in a triangle shape.

The first mounting part 221 may be formed on a first end of the upper surface of the cover 220, the second mounting part 222 may be formed on a second end of the upper surface of the cover 220, and the third mounting part 223 may be formed on a front end of the upper surface of the cover 220 on the central axis between the first and second mounting parts 221 and 222.

The water pump 400 may be coupled to the first mounting part 221 and the second mounting part 222. The water pump 400 may be fixed to the upper surface of the water heater 200 by the first mounting part 221 and the second mounting part 222 and may create a pressure of coolant between the multi-way valve 300 and the water-cooled condenser 100.

The multi-way valve 300 may be coupled to the third mounting part 223. The multi-way valve 300 may be connected to the water pump 400, with a lower surface being coupled to the water heater 200 by the third mounting part 223. The multi-way valve 300 may control the direction of flow of coolant.

As illustrated in FIGS. 1 and 2, the integrated coolant heating module 10 for the vehicle according to the embodiment of the present disclosure may further include a bracket 410. The bracket 410 may be provided to surround an outer circumferential surface of the water pump 400. The bracket 410 may be directly coupled to the mounting parts of the water heater 200 to perform a function of coupling the water pump 400 to the water heater 200. That is, the water pump 400 may be coupled indirectly coupled to the water heater 200 by the bracket 410, rather than being directly coupled to the mounting parts of the water heater 200.

A damper 420 may be provided on an inner circumferential surface of the bracket 410 where the bracket 410 and the water pump 400 are in contact with each other. The damper 420 may be made of a material capable of absorbing shock, such as a rubber material. The damper 420 may perform a function of insulating noise or vibration of the water pump 400 from being transmitted to the vehicle body through the water heater 200 due to contact between the bracket 410 and the water pump 400.

The bracket 410 may include a lower bracket and an upper bracket. The lower bracket may be provided along a circumference of a lower surface of the water pump 400 and may be directly connected to the mounting parts of the water heater 200. The upper bracket 410 may be provided along a circumference of an upper surface of the water pump 400, with opposite ends being connected to the lower bracket.

Further, a through-hole 411 allowing a fastening bolt 412 to be inserted thereinto may be formed at each of opposite sides of each of the lower bracket and the upper bracket. The fastening bolt 412 may pass through the respective through-holes 411 of the lower bracket and the upper bracket to couple the lower bracket and the upper bracket to each other. Since the lower bracket and the upper bracket are firmly coupled to each other by the fastening bolt 412 and the lower bracket is connected to the mounting parts of the water heater 200, the water pump 400 may be firmly fixed in position.

Further, a hole H allowing a flange bolt B to be inserted thereinto may be formed in an upper surface of each of the mounting parts of the water heater 200. A damper bush D that additionally absorbs noise or vibration of the water pump may be coupled to each of opposite ends of the lower bracket. The damper bush D and an associated one of the mounting parts may be coupled to each other by the flange bolt whereby the lower bracket may be connected to the water heater 200. Here, the damper bush D of the lower bracket may be supported by the flange bolt B, whereby the lower bracket may be firmly connected to the water heater 200 without requiring additional screwing.

The multi-way valve 300 may have a first side connected to the water pump 400, and a second side having a fixing part 310 directly connected to the mounting part of the water heater 200. The multi-way valve 300 may be connected and coupled to the mounting part by the fixing part 310. The fixing part 310 may be connected to the third mounting part 223 of the water heater 200.

The multi-way valve 300 may be an integrally injection-molded structure including the fixing part 310. The fixing part 310 may not be provided as a separate member, but the multi-way valve 300 may be injection molded and manufactured together with the fixing part 310 to form an integrally injection-molded structure including the fixing part 310. The multi-way valve 300 may be connected to the mounting part without requiring provision of a separate member. This structure provides an advantage of a simple assembly.

Further, the integrated vehicle coolant heating module 10 for the vehicle according to the embodiment of the present disclosure may further include a printed circuit board (PCB) P for integrated control.

In the related art, each of the water heater 200, the water pump 400, and the multi-way valve 300 is configured to include a driver PCB that controls driving. Since the PCB for controlling flow of coolant has to be provided separately for each component, there are problems of cost increase and weight increase due to the increase in the number of components.

However, in the present disclosure, by including the PCB P for integrated control, there is an advantage in that the water heater 200, the water pump 400, the multi-way valve 300 can be integrally controlled. That is, the water heater 200, the water pump 400, the multi-way valve 300 are integrally modularized with each other and thus can be individually controlled by one PCB P for integrated control. This provides an effect that efficiency of the system can be improved and cost and weight can be reduced compared to the case where the PCB is provided for each component.

The integrated coolant heating module 10 for the vehicle according to the embodiment of the present disclosure has a reduced number of various components, unlike the related art, thereby reducing the weight of the entire system. Therefore, there are advantages of improved electric vehicle (EV) efficiency and cost savings. There is another advantage of a simple assembly of the components resulting in easy manufacturing of the module.

Although a particular embodiment of the present disclosure has been described for illustrative purposes, those skilled in the art will appreciate that various modifications, additions and substitutions are possible, without departing from the scope and spirit of the disclosure as disclosed in the accompanying claims.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An integrated coolant heating module for a vehicle, the module comprising:
    a water-cooled condenser having a plurality of refrigerant inlet/outlet ports and a plurality of coolant inlet/outlet ports, the water-cooled condenser being configured to exchange heat between coolant and refrigerant that circulate therein;
    a water heater having an outer surface including a plurality of mounting parts, the water heater being coupled to the water-cooled condenser at one side, and the water heater being configured to selectively heat the coolant passing through the water-cooled condenser by being connected to a first coolant inlet/outlet port of the water-cooled condenser at an inlet of the water-cooled condenser;
    a multi-way valve coupled to one of the plurality of mounting parts of the water heater, the multi-way valve being configured to control a direction of flow of the coolant; and
    a water pump coupled to a second one of the plurality of mounting parts of the water heater, the water pump having a first side connected to the multi-way valve and a second side connected to a second coolant inlet/outlet port of the water-cooled condenser, the water pump being configured to create a pressure of the coolant between the multi-way valve and the water-cooled condenser.

2. The module of claim 1, wherein the water heater comprises:

a main body having a built-in heater module; and a cover covering the main body;

wherein the cover is an integrally injection-molded structure including the plurality of mounting parts.

3. The module of claim 2, wherein a lower end of the water heater and a lower end of the water-cooled condenser are coupled to a vehicle body, the water-cooled condenser is disposed on a side of the water heater, the main body of the water heater has a coupling part formed on a side surface thereof and coupled to the water-cooled condenser, and the water heater and the water-cooled condenser are directly coupled to each other by the coupling part.

4. The module of claim 3, wherein the coupling part of the water heater is configured to be detachable from the water-cooled condenser so that the water heater and the water-cooled condenser are detachably assembled to each other.

5. The module of claim 2, wherein the main body of the water heater has an open upper surface, and the cover is coupled to the upper surface of the main body; and first, second, and third mounting parts are formed on an upper surface of the cover and arranged in a triangle shape, wherein the first mounting part is formed on a first end of the upper surface of the cover, the second mounting part is formed on a second end of the upper surface of the cover, and the third mounting part is formed on a front end of the upper surface of the cover on a central axis between the first and second mounting parts.

6. The module of claim 5, wherein the water pump is coupled to the first and second mounting parts, and the multi-way valve is coupled to the third mounting part.

7. The module of claim 1, further comprising:

a bracket provided to surround an outer circumferential surface of the water pump, and directly coupled to the mounting part of the water heater to couple the water pump to the water heater.

8. The module of claim 7, wherein a damper is provided on an inner circumferential surface of the bracket where the bracket and the water pump are in contact with each other, and the damper is configured to insulate noise or vibration of the water pump from being transmitted to a vehicle body through the water heater due to contact between the bracket and the water pump.

9. The module of claim 7, wherein the bracket comprises:

a lower bracket provided along a circumference of a lower surface of the water pump and directly connected to the mounting part of the water heater; and an upper bracket provided along a circumference of an upper surface of the water pump and having opposite ends connected to the lower bracket.

10. The module of claim 9, wherein a through-hole allowing a fastening bolt to be inserted thereinto is formed at each of opposite sides of each of the lower bracket and the upper bracket, and the fastening bolt passes through the respective through-holes of the lower bracket and the upper bracket to couple the lower bracket and the upper bracket to each other.

11. The module of claim 9, wherein a hole allowing a flange bolt to be inserted thereinto is formed in an upper surface of the mounting part of the water heater, a damper bush additionally absorbing noise or vibration of the water pump is coupled to each of opposite ends of the lower bracket, and the damper bush and the mounting part are coupled to each other by the flange bolt whereby the lower bracket is connected to the water heater.

12. The module of claim 1, wherein the multi-way valve comprises a fixing part directly connected to the mounting part of the water heater.

13. The module of claim 12, wherein the multi-way valve is an integrally injection-molded structure including the fixing part.

14. The module of claim 1, further comprising:

a printed circuit board (PCB) for integrated control that simultaneously controls driving of the water heater, the multi-way valve, and the water pump.

15. The module of claim 1, wherein the water pump and multi-way valve are directly connected to each other, the inlet of the water heater is connected to the first coolant inlet/outlet port of the water-cooled condenser by a first hose, and the multi-way valve is connected to the second coolant inlet/outlet port of the water-cooled condenser by a second hose.

* * * * *